United States Patent [19]
Petot et al.

[11] Patent Number: 5,396,770
[45] Date of Patent: Mar. 14, 1995

[54] ELECTROTHERMAL ACTUATOR WITH LATCH MECHANISM

[75] Inventors: Bradford W. Petot, Cleveland Hts.; Edward J. Stropkay, Chesterland, both of Ohio

[73] Assignee: Design & Manufacturing Corporation, Willoughby, Ohio

[21] Appl. No.: 172,945

[22] Filed: Dec. 27, 1993

[51] Int. Cl.⁶ .............................................. F03G 7/06
[52] U.S. Cl. ........................................ 60/531; 60/516; 60/528; 251/68
[58] Field of Search .................... 60/531, 528, 516; 251/11, 68

[56] References Cited

U.S. PATENT DOCUMENTS

| | | | |
|---|---|---|---|
| 4,029,941 | 6/1977 | Huebscher et al. | 219/511 |
| 4,070,859 | 1/1978 | Sobecks | 60/530 |
| 4,079,589 | 3/1978 | Birli | 60/530 |
| 4,104,507 | 8/1978 | Tisone et al. | 219/513 |
| 4,759,189 | 7/1988 | Stropkay et al. | 60/531 |
| 4,887,429 | 12/1989 | Birli, Sr. et al. | 60/527 |
| 5,023,171 | 4/1993 | Petot et al. | 60/531 |

Primary Examiner—Ira S. Lazarus
Assistant Examiner—L. Heyman
Attorney, Agent, or Firm—Leydig, Voit & Mayer

[57] ABSTRACT

An electrothermal actuator includes a housing containing a working fluid and a heater disposed in the fluid within the housing. A piston is slidably disposed in the housing for movement in response to heating and cooling of the working fluid. An output member is coupled to the piston and movable between first and second positions for transmitting a drive force from the piston to a load. A latch mechanism is operatively connected to the output member for releasably latching the output member in the second position without continuously heating the working fluid. The latch mechanism includes a coil and a magnetic member that releases the latch in response to a force produced by a magnetic field generated when a current flows through the coil. The output member can move linearly or rotationally.

19 Claims, 3 Drawing Sheets

ELECTROTHERMAL ACTUATOR WITH LATCH MECHANISM

FIELD OF THE INVENTION

This invention relates to an electrothermal actuator which can be maintained in an actuated state without continuous application of electrical energy.

BACKGROUND OF THE INVENTION

Electrothermal actuators actuate a shaft in response to electrical energy. The electrical energy causes an electrical heater disposed in a variable-volume chamber filled with a working fluid to heat the working fluid. The working fluid boils and expands, expanding the chamber volume and driving the shaft. The motion of the shaft can be used to drive an external device. Examples of electrothermal actuators are disclosed in U.S. Pat. Nos. 4,029,941, 4,070,859, 4,079,589, 4,104,507, 4,759,189, 4,887,429, and 5,203,171, the disclosures of which are incorporated herein by reference.

Conventional electrothermal actuators drive the shaft only so long as an electrical current is supplied to the heater. In many uses of actuators, it is desired to move the shaft to a prescribed position and maintain the shaft in that position for a lengthy period of time. In these applications, it is necessary to continuously supply current to the heater either to maintain the desired positioning of the shaft or to latch the shaft. Continuous application of electrical energy is disadvantageous because the lifetime of the heater is reduced, the heat generated for long periods may damage parts of the actuator, and the continuous power consumption requires an increased capacity power supply.

SUMMARY OF THE INVENTION

Accordingly, it is an object of the present invention to provide an electrothermal actuator having a shaft that can be maintained in an actuated state without continuous application of electrical power to the actuator.

An electrothermal actuator according to the present invention includes a housing containing a working fluid and a heater disposed in the working fluid within the housing. A piston is slidably disposed within the housing for movement between first and second positions in response to changes in the volume of the working fluid produced by heating of the working fluid. An output member is coupled to the piston for transmitting a drive force from the piston to a load. The output member is movable between first and second positions respectively corresponding to first and second positions of the piston. A latch mechanism is operatively connected to the output member for releasably latching the output member in the second position so that when the heater is turned off, the output member remains in the second position.

The latch mechanism has a latched state and a released state. In preferred embodiments, the latch mechanism includes an electrical coil that can be energized with an electrical pulse to release the latch mechanism. The actuator does not require any electrical power to maintain the output member in the second position, i.e., in the latched state.

DESCRIPTION OF THE PREFERRED EMBODIMENTS

Figure 1:
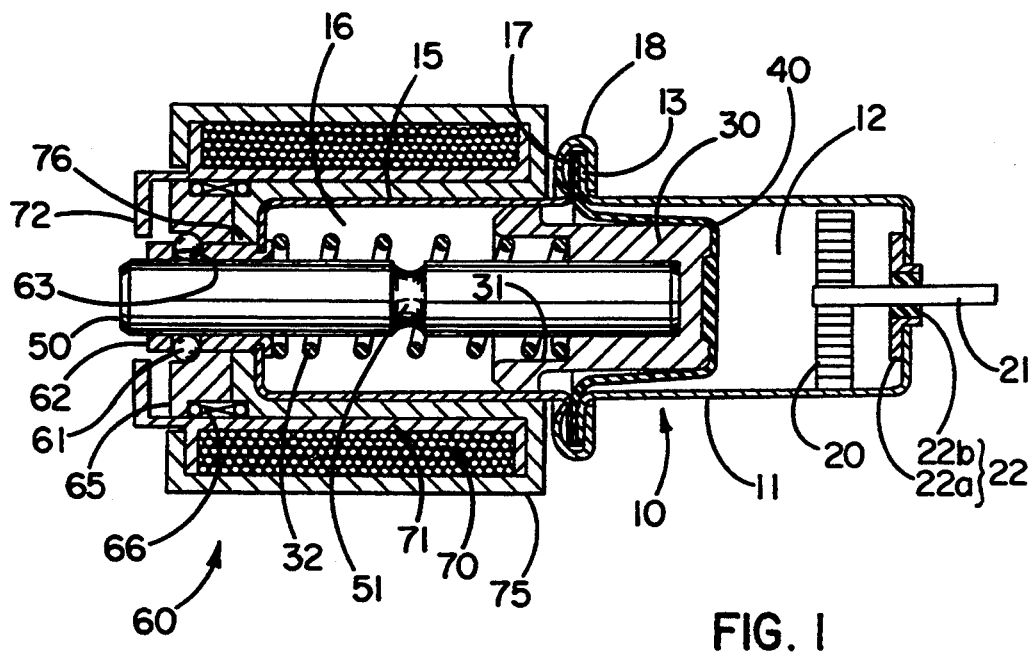
FIG. 1 is a cross-sectional view of an embodiment of an actuator according to the present invention in an unactuated state.
Figure 2:
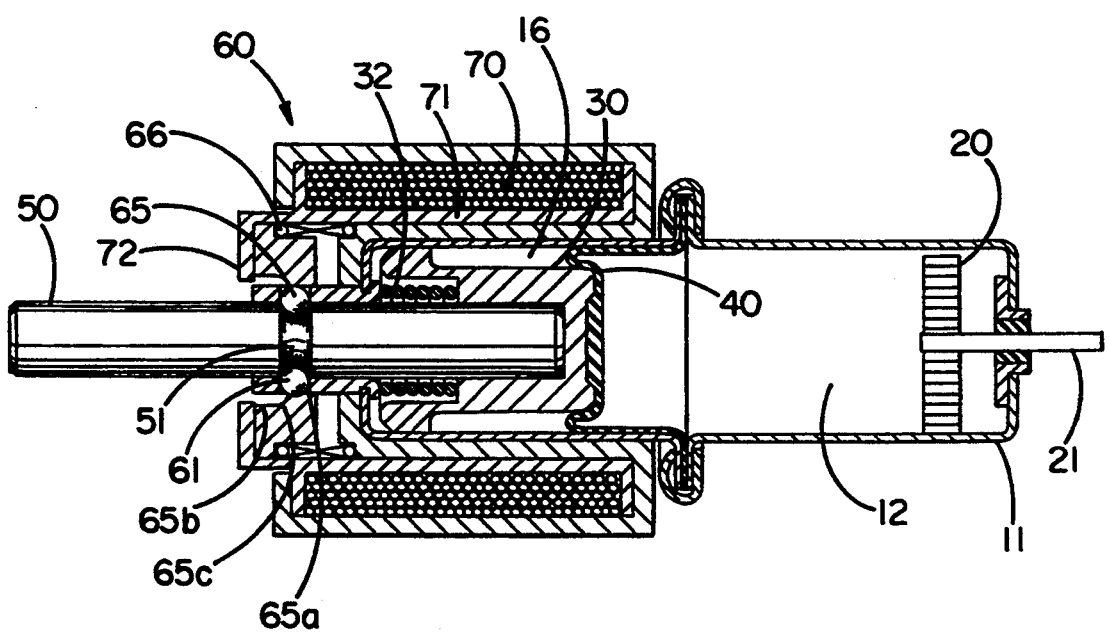
FIG. 2 is a cross-sectional view of the actuator embodiment of FIG. 1 in a latched state.

FIGS. 1 and 2 illustrate an actuator according to a first embodiment of the invention in an unactuated state and a latched state, respectively. The actuator includes a housing 10 having a first housing section 11 and a second housing section 15. A piston 30 is slidably disposed inside the housing 10 and can move linearly between a first, unactuated position shown in FIG. 1 and a second, actuated position shown in FIG. 2. The inside of the housing 10 is divided by an elastomeric rolling diaphragm 40 into a first variable-volume chamber 12 and a second variable-volume chamber 16. The outer diameter of the piston 30 is selected so that the diaphragm 40 rolls smoothly between the piston 30 and the housing 10. The first chamber 12 is filled with a working fluid that undergoes a liquid-to-gas phase transition upon heating. The rolling diaphragm 40 bears on the end of and drives the piston 30. Although a rolling diaphragm is the preferred fluid-tight seal between the piston 30 and the housing 10, it might be replaced by sliding seals on the outer periphery of the piston 30.

The first and second housing sections 11 and 15 can be joined to one another by any means that prevents fluid from leaking between the first and second chambers 12 and 16 or out of the housing 10. In this embodiment, opposing flanges 13 and 17 on the opposing ends of housing sections 11 and 15, respectively, sandwich the edge of the rolling diaphragm 40. The flanges 13 and 17 and the diaphragm 40 are held together in a fluid-tight seal by a crimp ring 18 that fits over the flanges 13 and 17 or other suitable means.

A heater 20 for heating and vaporizing the working fluid is disposed inside the boiler chamber 12. The heater 20 may be any type of electrical heater compatible with the working fluid. For example, it may be a conventional resistance heater, such as a spiral-wound or helically-wound heater, or it may be a positive temperature coefficient (PTC) heater, the resistance of which increases as its temperature increases. Alternatively, a conventional resistance heater and a PTC heater can be connected in series, as described in U.S. Pat. No. 4,759,189. The heater may be energized with either an alternating or direct current.

Preferably, the heater 20 is wound in a planar spiral shape with one end electrically connected to a lead 21 and the other end electrically connected to a second lead (not shown) protruding from the housing 11 parallel to and similar to the lead 21. Alternatively, the second lead may be the first housing section 11 if the housing section is electrically conducting and an appropriate contact is made inside the housing. The leads are electrically connected to an unillustrated electrical power supply for energizing the actuator. The lead 21 passes out of the first housing section 11 through an electrical feed-through 22, hermetically sealing the first housing section 11. The feed-through 22 includes a metal ring 22a of steel, for example, secured to the first housing section 11 by soldering, brazing, or welding, for example, and an electrical insulator 22b such as glass that fills the space between the lead 21 and the inner periphery of the ring 22a and electrically insulates the lead 21 from the first housing section 11.

The inside of the first housing section 11 may be lined with an insulating material to retain the heat generated by the heater 20 within the housing 10. The effectiveness of such an insulating lining can be improved by including an air space between the inner wall of the housing 10 and the outer wall of the lining. An example of a suitable lining material is a high temperature plastic. In the present invention, the heater 20 is only activated for short periods of time to actuate the piston 30, so a thermally insulating lining is not essential for efficient operation of the actuator.

The working fluid is an electrically insulating material that is a liquid at the ambient temperature of the actuator and that is rapidly brought to its boiling point by the heater 20. Preferred fluids are organic materials, particularly fluorocarbons.

The diaphragm 40 can be any flexible material that is impervious to the working fluid and can withstand the temperature of the boiling working fluid, such as rubbers including neoprene and urethane rubber. The diaphragm 40 may be reinforced by a fiber backing.

The piston 30 is rigidly connected to a piston rod 50 for transmitting the drive force of the piston 30 to an unillustrated external load. The piston rod 50 extends through a hole in the second housing section 15. A circumferential recess 51 in the piston rod 50 along its length is used for latching.

A cavity 31 in the piston 30 receives one end of a return member, a helical return spring 32, disposed between the piston 30 and the second housing section 15. When the piston 30 is moved toward the actuated position, the return spring 32 is compressed and urges the piston 30 toward its unactuated position. Alternatively, if the load driven by the piston rod 50 constantly urges the piston rod 50 toward the unactuated position, the return spring 32 may be omitted.

An actuator according to the present invention includes a latch mechanism 60 for releasably latching the piston rod 50 from the second, latched position. The piston 30 will likewise be held in the actuated position tightly connected to the piston 50. The latch mechanism 60 includes one or more balls 61, such as ball bearings, loosely supported around the periphery of the piston rod 50 by a cylindrical ball holder 62 secured to the second housing section 15. In the present embodiment of the invention, the ball holder 62 has three equally spaced through holes 63, each of which receives one of the balls 61. In addition to supporting the balls 61, the ball holder 62 guides the piston rod 50 in linear movement. An annular release collar 65 made of a magnetic material surrounds the ball holder 62 and is slidable in the axial direction of the piston rod 50 between a released position shown in FIG. 1 and a latched position shown in FIG. 2. The collar 65 has an axially extending hole having a first diameter and defined by a first surface 65a, a second bore having a second diameter larger than the first diameter and defined by a second surface 65b, and a sloping cam surface 65c connecting the first and second surfaces. The collar 65 is biased toward the latched position by a compression spring 66. The distance from the outside surface of the piston rod 50, other that at the recess 51, to the first surface 65a of the bore is smaller than the diameter of the balls 61.

The second housing section 15 is surrounded by an electrical coil 70 comprising a plurality of turns of wire wrapped around a spool-shaped bobbin 71 mounted on the second housing section 15. The coil 70 is surrounded by a casing 75 that protects the coil 70 and secures it to the outside of the housing 10. The bobbin 71 and the casing 75 have opposing radially extending flanges 72 and 76, respectively, that limit movement of the collar 65 as it moves between the latched and released positions. The compression spring 66 is supported on an annular step on the outside surface of the collar 65 and an annular step on the outside surface of the flange 76 of the casing 75. When an electric current passes through the coil 70, the coil 70 and the collar 65 are magnetically coupled, and a magnetic force is exerted on the collar 65 that urges the collar 65 against the force of the compression spring 66, i.e., toward the released position from the latched position.

The collar 65 can be made of any magnetic material compatible with the environment of the actuator. Preferably, the piston rod 50, the balls 61, the ball holder 62, and the bobbin 71 are non-magnetic to concentrate the magnetic flux generated by the coil 70 in the collar 65. For example, the non-magnetic parts can be aluminum or a polymeric material. The casing 75, on the other hand, is preferably a ferrous or magnetically permeable material, functioning as a magnetic core for the coil 70, to increase the magnetic flux generated.

In FIG. 1, the heater 20 is off, so the working fluid is in a liquid state. The balls 61 rest against the outer periphery of the piston rod 50 outside of the recess 51. The compression spring 66 urges the collar 65 away from the heater 20 toward the latched position, but the balls 61 prevent movement of the collar 65 from the released position.

When an electrical current is supplied to the heater 20, the working fluid boils, rapidly increasing the pressure in the boiler chamber 12, forcing the piston 30 and rod 50 toward the collar 65 when the vapor pressure in the boiler chamber 12 overcomes a load on the rod 50 and the biasing force of the return spring 32. As the piston 30 moves toward the collar 65, it eventually reaches the actuated position shown in FIG. 2. When the recess 51 in the piston rod 50 becomes aligned with the balls 61, the balls are pressed into the recess 51 by the radially inward force exerted by the spring 66 through the cam surface 65c of the collar 65. When the balls 61 enter the recess 51, as shown in FIG. 2, the collar 65 passes over the top of the balls 61, moves toward, and comes to rest against the flange 72 in the latched position. The surface of the recess 51 exerts a radially outward force on the balls 61 when an axial force is applied to the piston rod 50. However, when the collar 65 is in the latched position, first surface 65a of the collar prevents the balls 61 from moving out of the recess 51.

As shown in the figures, the recess 51 extends entirely around the circumference of the piston rod 50; instead, the piston rod may include a plurality of non-circumferential recesses, each recess corresponding to one of the balls 61.

As soon as the collar 65 reaches the latched position, the supply of current to the heater 20 can be stopped. The piston rod 50, when fully extended, may open a switch, in addition to other work, disconnecting the heater 20 from a power supply. Once the heater 20 is disconnected, the vapor in the boiler chamber 12 returns to liquid form, and the pressure within the boiler chamber 12 falls. However, the piston rod 50 cannot return to the state of FIG. 1 from the state shown in FIG. 2 unless the balls 61 are released from the recess 51. Thus, the piston 30 is latched in the actuated position even when no electrical power is being supplied to the heater 20.

In order to return the piston 30 to its unactuated position, electrical power is momentarily supplied to the coil 70. The magnetic field generated by the coil 70 urges the collar 65 toward the heater 20, overcoming the biasing force exerted by the compression spring 66, and pulls the collar 65 to the released position. As soon as the first surface 65a of the collar moves beyond the balls 61, the balls 61 move outward under the camming force exerted by the inner surface of the recess 51, releasing the piston rod 50. The piston rod 50 is pushed back to its unactuated position in FIG. 1 by the return spring 32. Electrical power needs to be applied to the coil 70 only long enough for the first surface 65a of the collar 65 to move beyond the balls 61 so that the balls 61 can move radially outward from the recess 51. An electrical pulse of 10-20 milliseconds duration may be sufficient to move the collar 65 depending on the dimensions of the materials, the spring forces, the number of windings of the coil 70, and the magnitude of the current.

In the embodiment of FIGS. 1 and 2, the first housing section 11 comprises a single chamber. However, the first housing section 11 may be partitioned, as described in U.S. Pat. Nos. 4,070,859 and 4,079,589. Because of the partition, the fluid temperature in one chamber may be lower than that in the boiler chamber, so thermal degradation of the diaphragm can be decreased, resulting in a longer life-span for the actuator. The diaphragm may contact and seal the openings in the partition to produce snap-action actuation, as described in U.S. Pat. No. 4,079,589.

Figure 3:
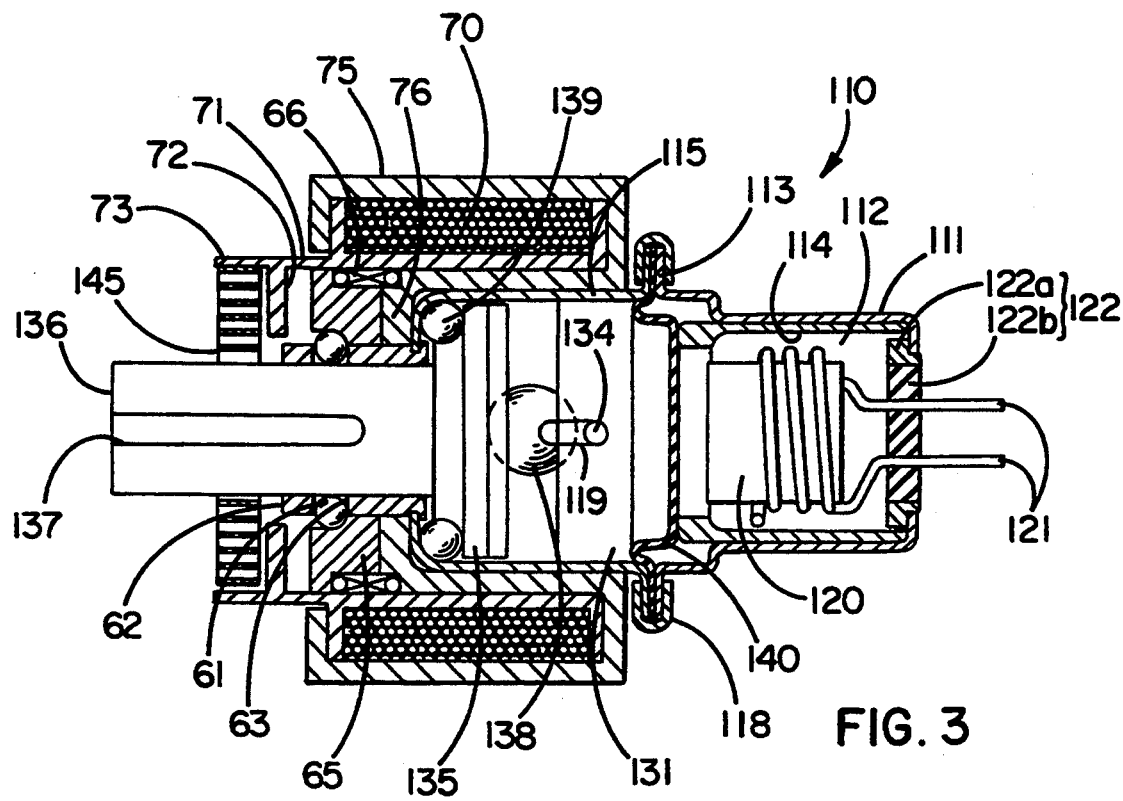
FIG. 3 is a cross-sectional view of another embodiment of an actuator according to the present invention in an unactuated state.
Figure 4:
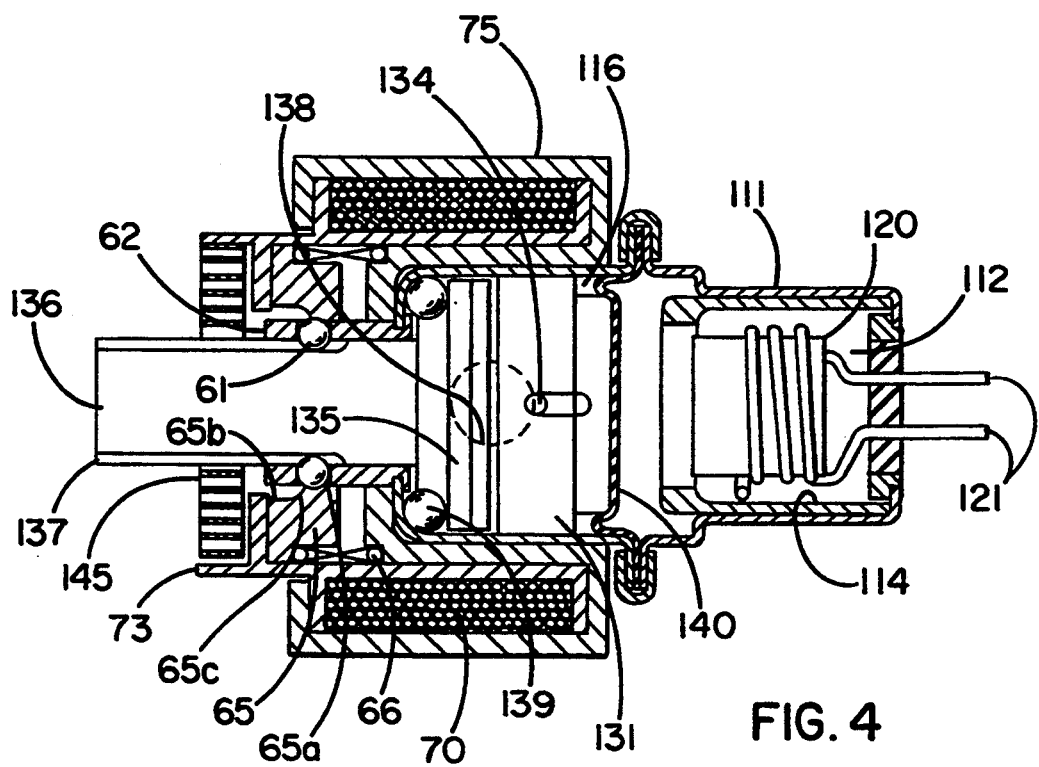
FIG. 4 is a cross-sectional view of the actuator embodiment of FIG. 3 in a latched state.
Figure 5:
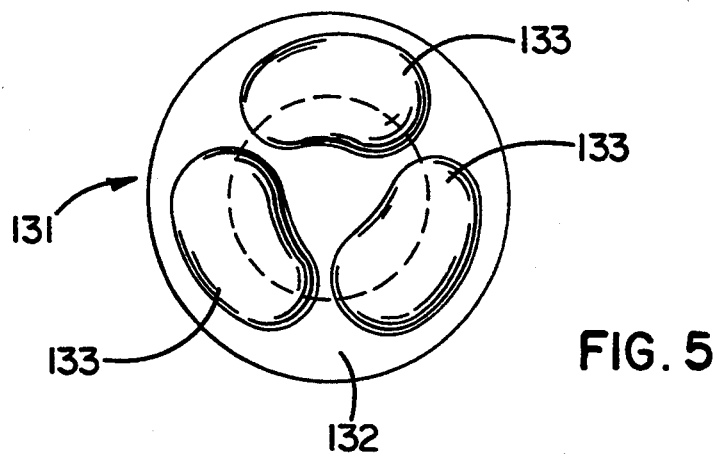
FIG. 5 is an end view of the piston of the actuator embodiment of FIGS. 3 and 4.

FIGS. 3, 4, and 5 illustrate another embodiment of the present invention. In this embodiment, the actuator produces a rotary displacement of a shaft rather than a linear displacement of a piston rod. The actuator includes a housing 110 having a first housing section 111 and a second housing section 115. The first housing section 111 encloses a first boiler chamber 112 containing the working fluid that changes from a liquid to a gas upon heating. A heater 120 is housed within the first chamber 112 and includes leads 121 connected to an unillustrated power supply after passing through a feedthrough 122 that closes the first housing section 111. A flexible elastic diaphragm 140 defines the front wall of the boiler chamber 112. The diaphragm 140 is held in place at its periphery between a flange 113 of the first housing section 111 and an opposing flange 116 of the second housing section 115 that are secured to each other with a crimped ring 118. The diaphragm 140 is the same as the diaphragm 40. The boiler chamber 112 may also include an optional liner 114 that insulates the first housing section 111 from electrical contact with the heater 120. The liner 114 may be a high temperature plastic or a resinous material.

The second housing section 115 encloses a rear part of a shaft assembly 130 including a rotary output shaft 136 that extends out of the second housing section 115 and is connected to an unillustrated load. The shaft assembly 130 includes a piston 131 driven by the diaphragm 140 and a cam 135. The piston 131 functions as a cam driver for the cam 135 and produces rotational motion of the cam 135 as the piston 131 reciprocates within the housing 110. The piston 131 and cam 135 are separated by and are in contact with a plurality of spherical members 138, such as ball bearings, only one of which is shown in the figures for clarity. The piston 131 and cam 135 include, on their opposing faces, variable-depth recesses of the same sense, with regard to their depth gradients, that receive the spherical members 138. Ball bearings 139 are interposed between the inside of the second housing section 115 and the shaft assembly 130, i.e., at the rear of the cam 135. A spiral, torsional return spring 145 is attached to the output shaft 136 to apply a biasing force, urging the output shaft 136 toward an unactuated position shown in FIG. 3. The return spring 145 is not needed when the load actuated by the output shaft 136 urges the output shaft 136 toward its unactuated position. A guide for preventing rotation of the piston 131 comprises a pin 134 attached to the piston 131 and a guide slot 119 in the second housing section 115 that receives the pin 134. The piston 131 slides linearly within the second housing section 115 but cannot rotate relative to the second housing section 115 due to the engagement of the pin 134 with the guide slot 119. Other means, such as a key in a keyway, can be used to guide the piston 131 while preventing rotation.

FIG. 5 shows the end face 132 of the piston 131. In the illustrated embodiment, the end face 132 includes three generally kidney-shaped recesses 133 lying along a circumference of a circle centered on the axis of rotation of the output shaft 136. Each of the recesses 133 has a depth that varies along the circumference of the circle. Generally, all of the recesses 133 are identical. The widest section of each recess 133 is the deepest portion and the narrowest portion is the shallowest section. The end face of the cam 135 has a similar structure including identical recesses.

This embodiment includes a latch mechanism 60 for releasably latching the actuator in an actuated state. As in the previous embodiment, the latch mechanism 60 includes one or more balls 61 supported by a ball holder 62 surrounding the output shaft 136. One or more elongated recesses 137, each corresponding to one of the balls 61, in the outer periphery of the output shaft 136 are spaced from one another in the circumferential direction of the output shaft 136. In this embodiment, each recess 137 is elongated in the axial direction of the output shaft 136, although the recesses may have another shape, such as a circular shape. When the output shaft 136 is in its unactuated position shown in FIG. 3, the recesses 137 are spaced from the balls 61, while when the output shaft 136 is rotated to its actuated position shown in FIG. 4, each recess 137 engages one of the balls 61. In this embodiment, there are three equally spaced balls 61 and three equally spaced recesses 137. The inner surface of each recess 137 applies a camming force to the corresponding ball 161, urging the ball 161 radially outward, i.e., out of the recess 137, when the output shaft 136 is rotated from its actuated to its unactuated position. The spiral return spring 145 for the output shaft 136 is secured at one end to a sleeve-shaped extension 73 of the bobbin 71. The structure of the latch mechanism 60 is otherwise the same as that of the embodiment of FIGS. 1 and 2.

When an appropriate electrical current flows through the leads 121, the heater 120 boils the working fluid within the first chamber 112, causing that fluid to become a gas. The resulting increased pressure urges the diaphragm 140 toward the second housing section 115, and an axial force is applied to the piston 131. The piston 131 attempts to slide forward, i.e., toward the output shaft 136, and is restrained from rotating relative to the housing by the pin 134 and the guide slot 119. To relieve the force and allow the piston 131 to move forward, the cam 135 rotates to the position shown in FIG. 4 so that the deepest portions of the opposed pairs of recesses 133 of the piston 131 and cam 135, respectively, are disposed opposite each other.

Initially, as shown in FIG. 3 in the unactuated position, the shallower portions of the opposed recesses 133 are opposite each other with the spherical members 138 positioned in the shallower portions of the recesses 133. In order to continue to accommodate the spherical members 138 and to relieve the pressure applied by the diaphragm 140, the output shaft 136 assembly rotates, bringing the spherical members 138 into the deepest portions of the opposed recesses 133, as shown in FIG. 4. The rotation of cam 135 causes a counterclockwise rotation of the output shaft 136. The ball bearings 139 reduce the friction between the shaft assembly 130 and the housing 110, facilitating the rotation of the output shaft 136.

When the output shaft 136 is in its unactuated position, the axial force exerted by the compression spring 66 presses the cam surface 65c of the collar 65 against the balls 61 and urges them radially inward against the outer surface of the output shaft 136. In this state, the balls 61 block axial movement of the collar 65.

As soon as the output shaft 136 rotates to its actuated position, the recesses 137 in the output shaft 136 align with the balls 61, and the cam surface 65c of the collar 65 urges the balls 61 radially inward and into the recesses 137. When the balls 61 enter the recesses 137, the balls 61 no longer block axial movement of the collar 65, and the compression spring 66 urges the collar 65 to its latched position as shown in FIG. 4. The first surface 65a of the bore of the collar 65 abuts the balls 61 and prevents the balls 61 from being pushed radially outward from the recesses 137. Since the output shaft 136 cannot rotate unless the balls 61 are ejected from the recesses 137, the output shaft 136 is latched in its actuated position by the collar 65 and the balls 61 without the necessity of the diaphragm 140 applying an axial force to the piston 131. Therefore, as soon as the output shaft 136 is latched, the flow of electrical current through the heater 120 can be stopped without return of the shaft 136 to the unactuated position.

When it is desired to return the output shaft 136 to its unactuated position, the coil 70 is energized with an electrical pulse, i.e., a short flow of current, and the magnetic field generated by the coil 70 exerts a force on the collar 65 that overcomes the biasing force of the compression spring and pulls the collar 65 to the released position. When the first surface 65a of the bore 65 moves clear of the balls 61, the balls 61 are free to move radially outward under the camming force exerted by the surfaces of the recesses 137, and the balls 61 are pushed out of the recesses 137. When the balls 61 leave the recesses 137, the torque applied by the return spring 145 rotates the output shaft 136 to its unactuated position.

The recesses 133 of the end face 132 illustrated in FIG. 5 result in clockwise rotation of the output shaft 136. A counterclockwise rotation can be achieved if the sense, i.e. the direction of depth variation of the recesses 133, is reversed.

Structures for producing a rotary motion in response to linear movement of a diaphragm 140 are not limited to the embodiments of FIGS. 3, 4, and 5. For example, the alternative structures described in U.S. Pat. No. 5,203,171 can be employed.

Figure 6:
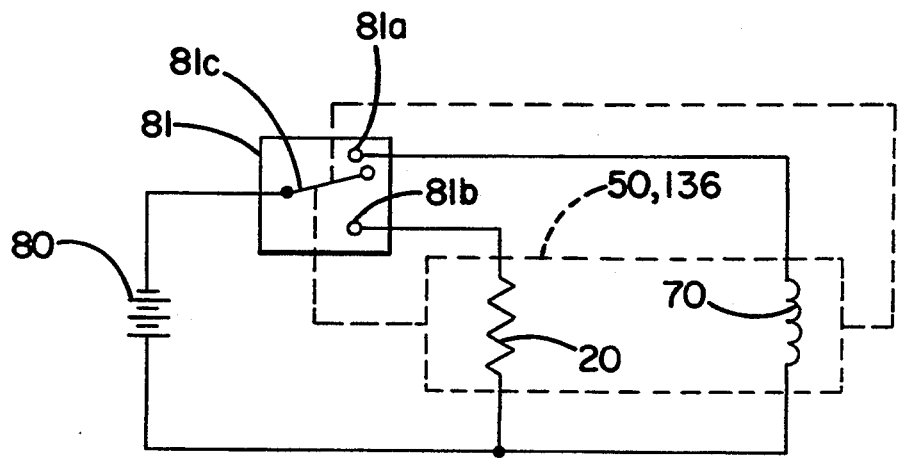
FIG. 6 is a schematic illustration of a control unit for use with the actuator embodiment of FIGS. 1 and 2.

FIG. 6 schematically illustrates an example of a control system that can be used to control the operation of the actuator embodiments described above. Electrical power for the heater and the coil is provided by an electrical power supply 80. One terminal of the power supply 80 is connected to a selector switch 81. The selector switch 81 is used to actuate and release the piston rod 50 or shaft 136. The switch 81 has a first terminal 81a connected to the coil 70 and a second terminal 81b connected to the heater 20. A movable contact 81c can be selectively switched between a release setting for energizing the coil 70 and an actuate setting for supplying a current to the heater. The closed positions of the switch 81 may be momentary for heating the working fluid and releasing the latching mechanism. As mentioned above, and indicated schematically by the dashed lines in FIG. 6, the movable contact 81c may be opened from a connection to the actuate terminal 81b by the extension of the piston rod 50 or rotation of the shaft 136. Likewise, closure of the switch contact 81c to the terminal 81a to release the piston rod or shaft may be terminated by retraction of the piston rod 50 or return of the shaft 136 to the original position, opening the switch.

Figure 7:
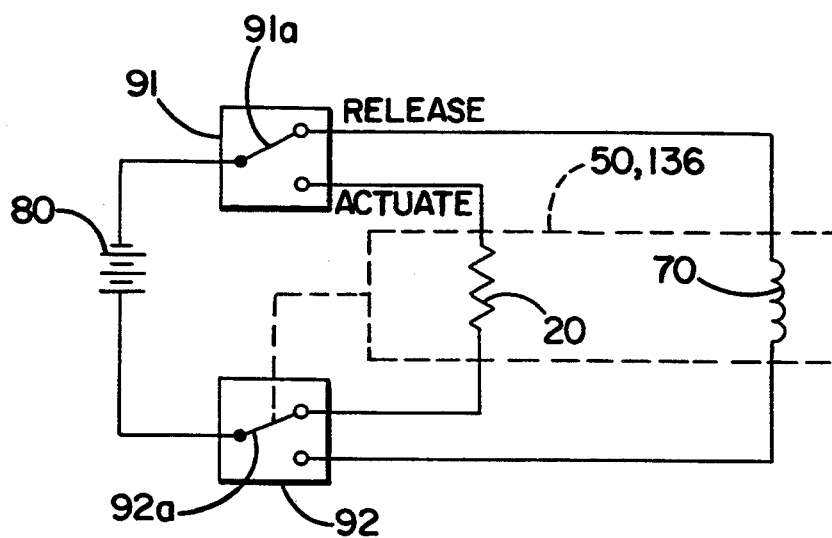
FIG. 7 is a schematic illustration of an alternative control unit for use with the actuator embodiment of FIGS. 1 and 2.

FIG. 7 schematically illustrates an example of an alternative control unit that can be used to control the operation of the actuator embodiments described above. The same elements shown in FIG. 6 are given the same reference numbers in FIG. 7. In the control arrangement of FIG. 7, the power supply 80 is connected to a selector switch 91 that can selectively connect one terminal of the power supply 80 to either a release terminal or an actuate terminal. The release terminal is connected to the coil 70 and the actuate terminal is connected to the heater 20. The coil 70 and the heater 20 are also connected to respective terminals of a transfer switch 92. The movable contact 92a of the transfer switch 92 is mechanically connected to the output member, i.e., the piston rod 50 or the shaft 136, of the actuator. The movable contact 92a is driven by the output member. The output terminal of the transfer switch 92 is connected to the terminal of the power supply 80 that is not connected to the selector switch 91.

As shown in FIG. 7, in one of the two quiescent states, a movable contact 91a of the selector switch 91 is connected to the release terminal, i.e., to the coil 70. The movable contact 92a of the transfer switch 92 is connected to the heater 20. Normally, the selector switch is available for operation by a user whereas the transfer switch is inaccessible to a user. When it is desired to actuate the actuator, i.e., extend the piston rod 50 or rotate the shaft 136, the user operates the selector switch 91, moving the movable contact 91a to the actuate position. A circuit including the heater 20 and power supply 80 is closed so that a current flows through the heater coil 20, resulting in extension of the piston rod 50 or rotation of the shaft 136. In response to that movement, the output member moves the movable contact 92a of the transfer switch 92 to the terminal that is connected to the coil 70, terminating the current flow through the heater 20. When it is desired to release the actuator, the user moves the movable contact 91a of the selector switch to the release terminal, completing a circuit including the coil 70 so that current flows through the coil 70, resulting in release of the output member, i.e., the piston rod 50 or the shaft 136. That movement of the output member, in turn, moves the movable contact 92a of the transfer switch to the terminal connected to the heater, terminating the flow of current through the coil 70 and returning the circuit to the arrangement shown in FIG. 7. The control arrangement of FIG. 7 is more complex than that of FIG. 6 because it includes two switches but it is more practical since only a single mechanical interconnection between the output member and one of the switches, i.e., the transfer switch, is required.

The invention has been described with respect to certain preferred embodiments. Various additions and modifications will occur to those of skill in the art from the foregoing description. Accordingly, the scope of the invention is limited solely by the following claims.

We claim:

1. An electrothermal actuator comprising:
   a working fluid changing phase upon heating;
   a housing containing the working fluid;
   an electrical heater disposed within the housing for heating the working fluid;
   a piston slidably disposed in the housing and movable between first and second positions in response to heating and cooling of the working fluid, respectively;
   an output member coupled to the piston for transmitting a drive force from the piston to a load and movable between first and second positions corresponding to the first and second positions of the piston; and
   a latch mechanism operatively connected to the output member for releasably latching the output member in the second position of the output member, whereby the output member may be maintained in the second position without continuously heating the working fluid.

2. The actuator of claim 1 wherein the latch mechanism includes a magnetic member for releasably engaging the output member in the second position of the output member and a coil for generating a magnetic field applying a force to the magnetic member to release the output member from the second position.

3. The actuator of claim 2 wherein the magnetic member includes a magnetic collar movable with respect to the output member between a latched position maintaining the output member in the second position and a released position with the output member in the first position and a first biasing member biasing the collar toward the latched position.

4. The actuator of claim 3 wherein the latch mechanism includes a second biasing member biasing the collar toward the released position.

5. The actuator of claim 4 wherein the first biasing member comprises a spring.

6. The actuator of claim 4 wherein the collar includes a cam surface and the second biasing member comprises at least one ball bearing on the output member and the cam surface when the output member is in the first position.

7. The actuator of claim 1 wherein the piston moves linearly within the housing between the first and second positions.

8. The actuator of claim 7 wherein the output member comprises a piston rod connected to the piston for linear movement.

9. The actuator of claim 7 wherein the output member comprises means for converting linear movement of the piston into rotational movement of the output member.

10. The actuator of claim 3 wherein the output member includes a recess, the latch mechanism includes a ball disposed between the output member and the collar and movable into and out of the recess, the ball inhibiting movement of the output member from the second position when the ball is in the recess and the collar is in the latched position and permitting movement of the output member from the second position when the collar is released, and the collar maintaining the ball in the recess when the collar is in the latched position and permitting the ball to move out of the recess when the collar is released.

11. The actuator of claim 10 wherein the collar urges the ball toward the output member when the collar is in the released position.

12. The actuator of claim 10 wherein the latch mechanism includes a plurality of balls and the recess extends circumferentially around the piston rod.

13. The actuator of claim 10 wherein the latch mechanism includes a plurality of balls and the output member includes a plurality of recesses, each recess corresponding to and receiving one of the balls.

14. The actuator of claim 1 including a rolling diaphragm connected to the housing, bearing on the piston, and separating the piston from the working fluid.

15. The actuator of claim 1 including means for supplying a current to the heater and wherein the actuator includes means for stopping current flow to the heater when the piston moves to the second position from the first position.

16. The actuator of claim 15 wherein the means for stopping current flow comprises a switch coupled to and actuated by the output member when the output member moves to the second position from the first position.

17. The actuator of claim 2 including means for supplying a current to the coil when the output member is in the second position and means for stopping current flow when the piston moves from the second position to the first position.

18. The actuator of claim 17 wherein the means for stopping current flow comprises a switch coupled to and actuated by the output member when the output member moves from the second position to the first position.

19. The actuator of claim 2 including means for supplying a current to the heater and the coil, a selector switch for selectively connecting the means for supplying a current to the heater and the coil, and a transfer switch actuated by the movement of the output member for selectively disconnecting the means for supplying a current from the heater and connecting the means for supplying a current to the coil and for selectively disconnecting the means for supplying a current from the coil and connecting the means for supplying a current to the heater.

* * * * *